United States Patent [19]

Borisuck et al.

[11] 3,751,200

[45] Aug. 7, 1973

[54] APPARATUS FOR MAKING A TWO COLOR RUBBER SOLE BY INJECTION MOLDING AND APPLYING UNITING PRESSURE

[75] Inventors: John F. Borisuck, Ruben A. LaChall, both of Naugatuck, Conn.

[73] Assignee: Uniroyal, Inc., New York, N.Y.

[22] Filed: Aug. 5, 1970

[21] Appl. No.: 61,457

[52] U.S. Cl............... 425/119, 425/120, 425/129, B29h/7/08
[51] Int. Cl............................. B29f 1/12, B29h 3/14
[58] Field of Search.................... 425/119, 120, 129, 425/130, 125, 127, 242, 352, 416; 264/244, 255

[56] References Cited
UNITED STATES PATENTS

| | | | |
|---|---|---|---|
| 3,305,895 | 2/1967 | Ludwig | 425/119 |
| 3,376,608 | 4/1968 | Wilcox | 425/119 |
| 3,374,504 | 3/1968 | Ludwig | 425/119 |
| 3,303,532 | 2/1967 | Ludwig | 425/119 X |

Primary Examiner—J. Spencer Overholser
Assistant Examiner—David S. Safran
Attorney—Henry Sternberg

[57] ABSTRACT

An article of footwear having a two-color rubber sole construction, and a method and apparatus for manufacturing the article. The sole construction includes a midsole-foxing component having foxing surrounding and engaging an outsole component which is vulcanized to the midsole-foxing component. The rubber used for the midsole-foxing component has a higher modulus than the rubber used for the outsole component. The higher modulus rubber is injected into a mold cavity having a colume considerably greater than the volume of the injected rubber, and a movable sole plate spreads the injected rubber against the underside of a lasted upper. The sole plate has a peripheral shoulder which determines the lower end and inner surface of the foxing. The lower modulus rubber is also injected into a mold cavity of considerably greater volume. The sole plate is again advanced toward the lasted upper to spread the outsole rubber against the midsole rubber to be vulcanized thereto.

7 Claims, 9 Drawing Figures

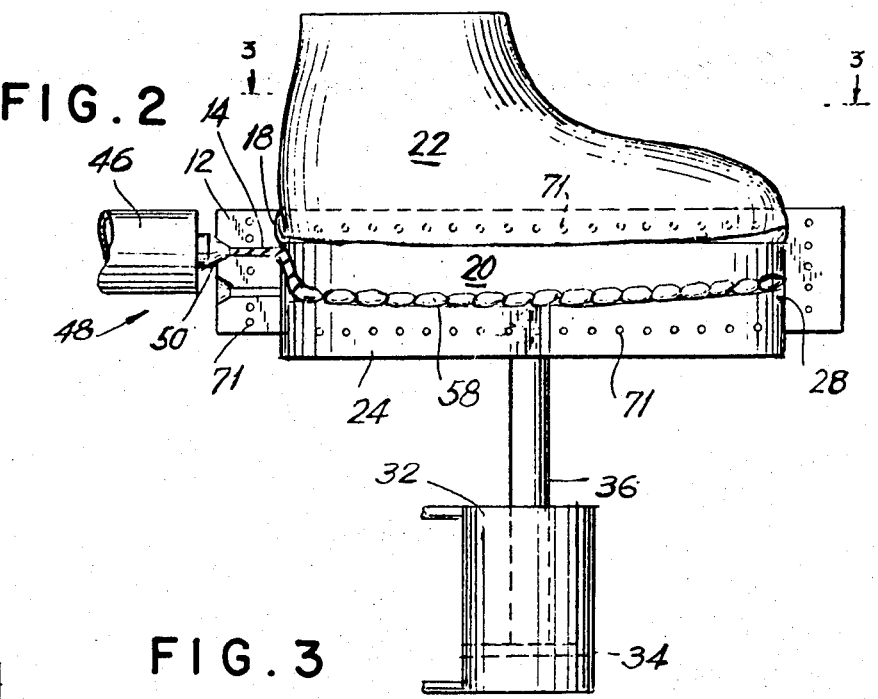
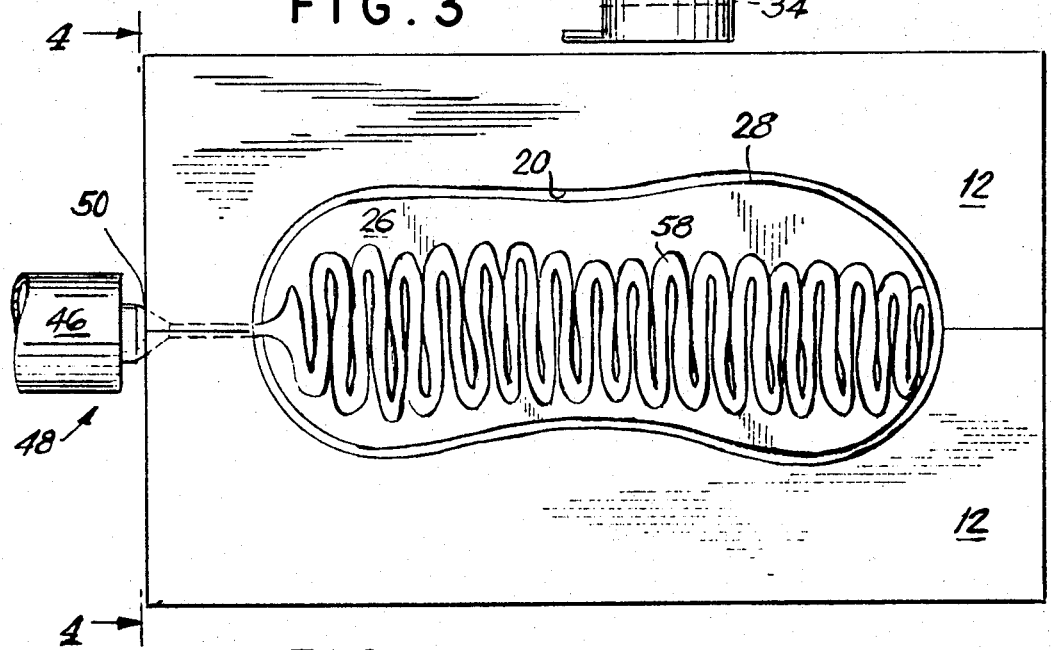
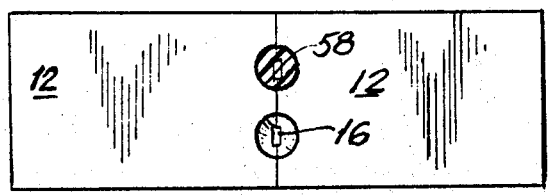

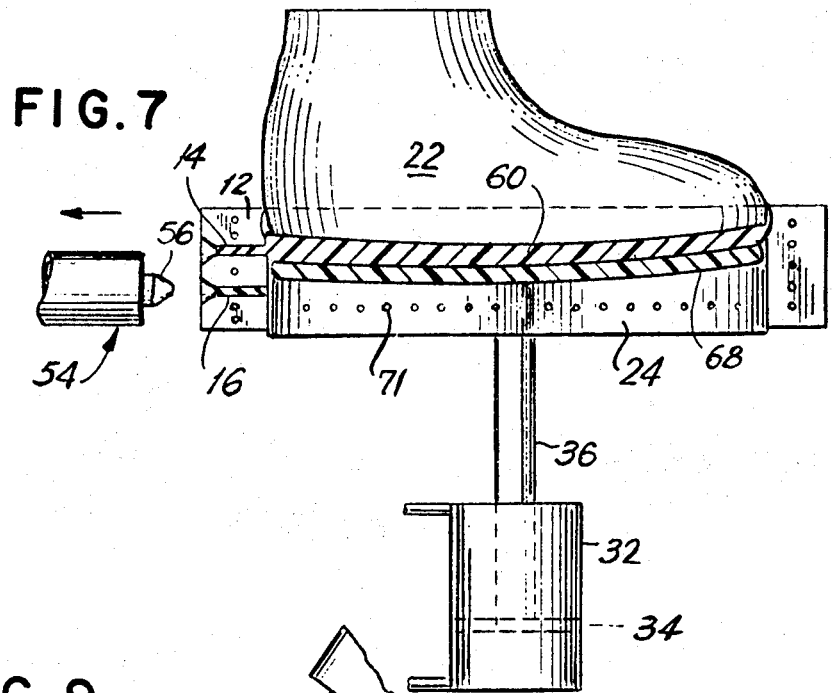
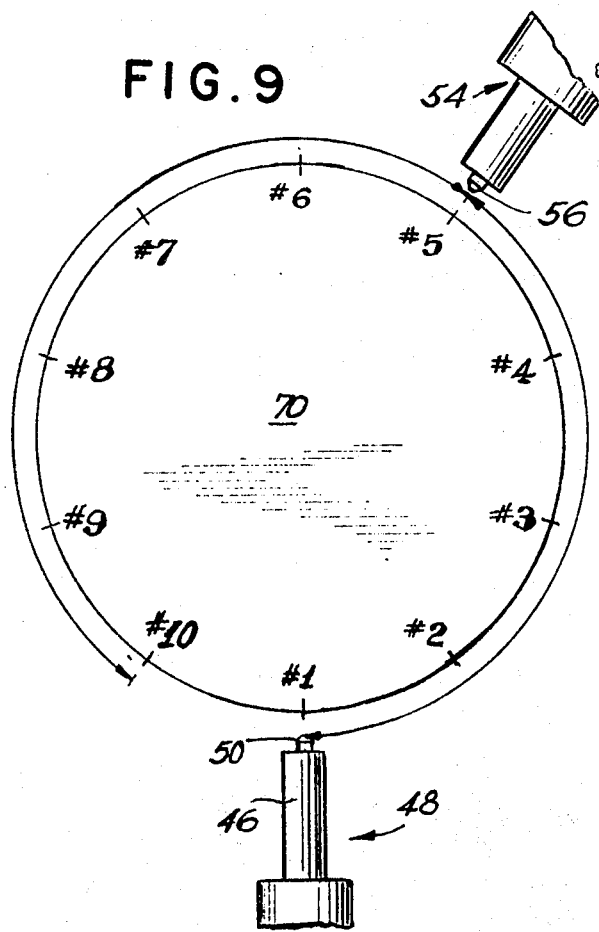
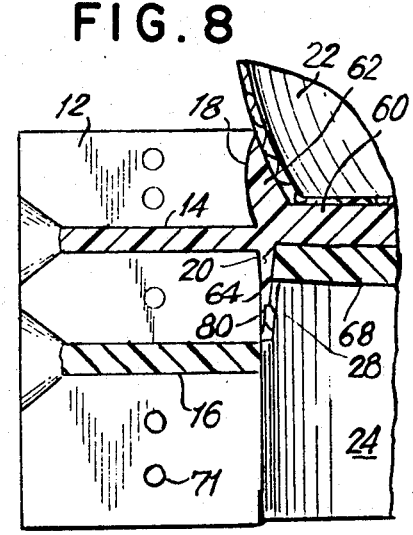

APPARATUS FOR MAKING A TWO COLOR RUBBER SALE BY INJECTION MOLDING AND APPLYING UNITING PRESSURE

BACKGROUND OF THE INVENTION

This is division of application Ser. No. 729,570, filed May 16, 1968.

The present invention relates to footwear.

In particular, the present invention relates to rubber-soled footwear and especially to footwear having a two-color rubber sole construction.

It is known to provide footwear having two-color sole structures made up of various plastic materials. While it is indeed highly desirable to use rubber in such a sole construction, up to the present time it has not been possible to manufacture footwear successfully with a two-color rubber sole construction using only injection or injection-compression means. When using other plastic compositions, the latter are easily injected into mold cavities, whose configurations conform to the desired midsole or outsole, so as to completely fill and set in these cavities. However, when using rubber, it is difficult to inject the rubber into a mold cavity the size of which corresponds to the required size of the midsole or outsole because of the extremely high pressure required to be used in connection with rubber injection.

Furthermore, in a two-color rubber sole construction, difficulties are encountered in that during injection of the outsole there is a tendency on the part of the latter to stretch and displace the midsole, even if the midsole is fully cured, causing undesirable rippling of the midsole. In addition, difficulties are encountered in achieving a sharp, well-defined boundary between the foxing and the outsole, because the material of the foxing undesirably mixes with that of the outsole. In addition, where a pair of injection ports are provided for the rubber materials which are respectively injected for the midsole and outsole, the initially injected material for the midsole unavoidably reaches the port for the outsole material, spewing into the latter and clogging this latter port, so that difficulties were encountered during injection of the material for the outsole.

Thus, even though rubber is highly desirable because of its resiliency, traction, and comfort, nevertheless it has not heretofore been possible to provide a completely satisfactory and practical method for making two-color rubber sole construction for footwear. By the term "two-color" as used herein, there is meant a pair of rubber materials of different elastic modulus.

SUMMARY OF THE INVENTION

It is accordingly a primary object of the present invention to provide a solution to the above problems.

Thus, it is an object of the invention to provide not only an article of footwear having a two-color rubber sole construction, but also to provide a method and apparatus for efficiently manufacturing this article.

Another object of the invention is to provide a method and apparatus which will make it possible to avoid the problems of undesirable stretching, rolling and rippling of the midsole component when the outsole material is pressed against the midsole.

Also, it is an object of the invention to provide a method and apparatus which is capable of achieving a clean, sharply defined junction between the outsole and the surrounding foxing.

Furthermore, it is an object of the invention to provide an article of footwear in which a midsole-foxing component is capable of protecting an outsole component, particularly at the periphery thereof, while at the same time excellent traction can be achieved with the rubber outsole component.

In addition, it is an object of the invention, to provide an article of footwear which will protect against bruising when stones or pebbles are stepped on.

According to the invention rubber of given modulus is injected in a precisely measured quantity into a heated mold cavity which has a volume substantially greater than the volume of the injected quantity of rubber, and this injected rubber is received on a sole plate which, after the injection, is advanced toward a lasted upper to spread the injected rubber against the upper to form a midsole which, through the application of heat to the mold, is vulcanized to the upper. The configuration of the mold is such that simultaneously with forming of the midsole a foxing is formed integrally with the midsole and has a portion which projects downwardly therefrom.

The sole plate is retracted and rubber of lower modulus than said given modulus is then injected in a precisely measured quantity which is also substantially less than the volume of the cavity into which it is injected. After this second injection the sole plate is again advanced toward the lasted upper so as to spread the lower modulus rubber against the higher modulus rubber midsole surrounded by the foxing, so as to achieve in this way an outsole component surrounded by and pressing against the foxing. The sole plate is retracted after the first injection when the rubber of the first injection has set sufficiently to provide a clean retraction of the sole plate without any sticking of the first-injected material thereto, but before the first-injected rubber has become fully cured, so that when the second-injected rubber is pressed against the first injected rubber in the heated mold it will become vulcanized thereto.

Because the second-injected rubber which forms the outsole is of a lower modulus than the first-injected rubber, this first-injected rubber is stiffer than the second-injected rubber and it is not possible for the second-injected rubber to cause undesirable stretching, rolling, or other displacement of the first-injected rubber. The outsole is thus vulcanized to the midsole-foxing component without any rippling or other undesirable conditions existing between the outsole and the midsole.

In the apparatus of the invention, the mold is defined by a pair of mold rings which surround the mold cavity and which have an inner surface extending upwardly to an elevation somewhat higher than the upper edge of the final foxing, while the sole plate is provided along its upper edge with a peripheral shoulder defining a recess into which the foxing extends. This shoulder of the sole plate thus determines the configuration of the inner surface of the foxing which surrounds and engages the outsole component as well as the extent to which the foxing extends downwardly beyond the bottom surface of the midsole after the first injection.

With this construction and method it has been found that there is no intermixing of the outsole material with the foxing at the outsole-foxing junction. Any intermixing which does occur, using the process of the present invention, is restricted to the lowermost portion of the downwardly depending foxing material and is therefore located below the plane at which trimming takes place. There is thus provided a clean, sharply defined junction line between the outsole and the foxing, so that it is possible to provide a two-color rubber sole structure in a highly efficient manner with the method and apparatus of the invention. In addition, because the outsole is surrounded by foxing of a higher modulus, the outsole is protected by the foxing. The softer outsole material provides a better traction for the footwear, and at the same time the harder or stiffer midsole material protects the foot against bruising when stepping upon stones, pebbles or the like.

BRIEF DESCRIPTION OF DRAWINGS

The invention is illustrated by way of example in the accompanying drawings which form part of this application and in which:

FIG. 2 shows the mold structure of FIG. 1, and components associated therewith, at the end of the first injection;

FIG. 3 is a partly sectional plan view taken along line 3—3 of FIG. 2 in the direction of the arrows and showing the interior of the mold with the first-injected rubber resting on the sole plate;

FIG. 4 is a transverse sectional elevation taken along line 4—4 of FIG. 3 in the direction of the arrows and showing the arrangement of the injection ports of the mold;

FIG. 7 is a schematic representation of the position which the parts take subsequent to that stage of the method which is illustrated in FIG. 6, FIG. 7 showing how the outsole component is vulcanized to the midsole-foxing component;

FIG. 8 is a fragmentary sectional elevation, on an enlarged scale, as compared to FIG. 7, taken in a vertical plane through the heel region of the mold where the injection ports are located and showing in detail the condition of the injected material and features of the apparatus of the invention; and FIG. 9 is a schematic representation of a rotary turntable and a pair of injection guns used in the manufacture of the footwear of the invention.

DESCRIPTION OF PREFERRED EMBODIMENTS

Figure 1:
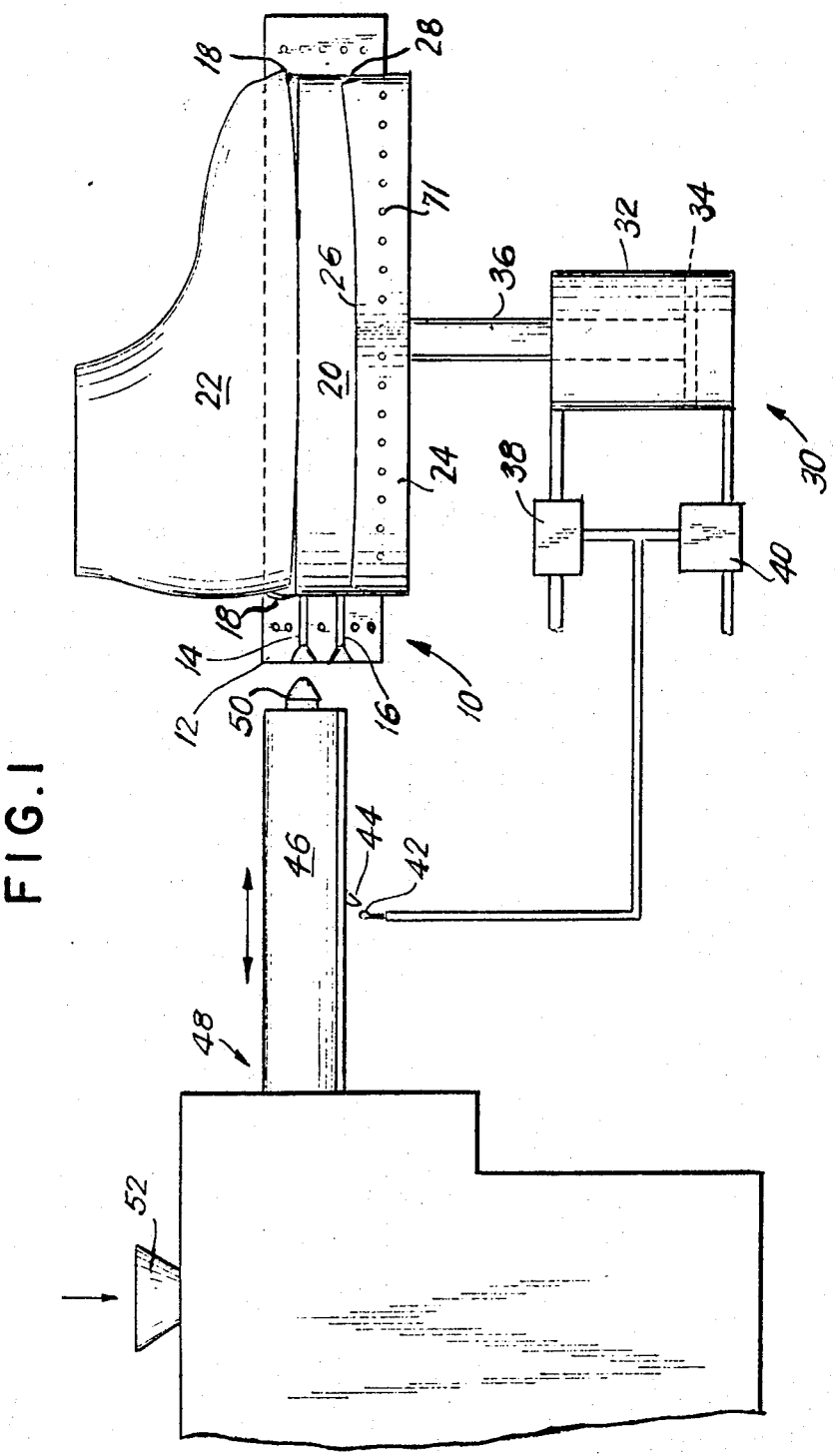
FIG. 1 is a schematic representation of the method and apparatus of the invention as shown in FIG. 1 at a time just prior to the first injection.

Referring now to the drawings, the mold 10 of the invention includes a pair of side rings 12 (FIG. 3) which can be moved in a known way toward and away from each other. The rings 12 are shown in FIG. 3 in their closed position where they engage each other to surround the mold cavity. As is apparent from FIG. 4, the side rings 12 are formed at the heel region of the mold cavity with elongated channels having tapered outer ends and a rectangular configuration in cross section so that when the rings 12 have the closed position shown in FIG. 3 and 4, the channels of the rings will come together to form a pair of injection ports 14 and 16 which are of rectangular cross section, being longer in the vertical direction than in the horizontal direction, while having conically shaped flaring ends to receive the conically shaped nozzle of the injection gun, as explained further below. The rings 12 are also formed next to their upper surfaces with internal peripheral grooves, so that when the rings 12 are in the closed position shown in the drawings, these internal peripheral grooves form an endless inner groove 18 of arcuate cross section to determine the exterior configuration of the upper portions of the foxing. The inner side surface 20 of the mold, defined by the closed rings 12 extends straight up to the lower edge of the groove 18 without any interruption, except for the injection ports 14 and 16.

A lasted upper 22 is introduced into the upper end of the mold cavity to close the mold cavity with the material of the upper, such as canvas, engaging the upper edge of the groove 18 of the inner periphery of the closed mold rings 12. In this way the top of the mold is closed by the lasted upper 22.

The mold further includes a sole plate 24 slidable along the inner side surface 20, formed by the closed side rings 12, toward and away from the lasted upper 22. The sole plate 24 has an upper surface 26 directed toward the lasted upper 22. Along the periphery of the surface 26 the sole plate 24 is formed with a peripheral shoulder 28 having the configuration shown most clearly in FIG. 8. In this way, the shoulder 28 defines with the inner side surface 20 of the mold cavity a recess surrounding the upper surface 26 of the sole plate 24.

The sole plate 24 is advanced upwardly and retracted downwardly by any well known structure such as the pneumatic assembly 30 illustrated in FIG. 1. This assembly 30 includes a cylinder 32 in which a piston 34 reciprocates, this piston being fixed to a piston rod 36 which in turn is fixed to the underside of the sole plate 24. A known valve assembly 38 is provided for introducing air under pressure to the top side of the piston 34 for retracting the sole plate while air at the under side of the piston 34 can escape through a lower known valve 40. On the other hand, air under pressure can be introduced through the valve 40 while air escapes through the valve 38 in order to advance the sole plate 24 upwardly toward the lasted upper 22. The valves 38 and 40 can be actuated as by way of switch structure 42 tripped by cam 44 (FIG. 1) carried by the barrel 46 of an injection gun assembly 48. Thus, for example during retraction of the barrel 46 from the mold 10 after the first injection, the switch 42 will be tripped to cause the sole plate 24 to rise, in a manner described in greater detail below.

The gun 48 has a conical discharge nozzle 50 capable of being received in the outer conical end of the injection port 14 for injecting the extrudate into the mold cavity, and the gun 48 can have any known construction according to which material supplied to the hopper 52 is placed in a flowable condition under pressure so as to be injected into the mold cavity in the form of a ribbon of preferably rectangular cross section issuing from the port 14. The pressure with which the extrudate is injected is of substantial magnitude as required for rubber.

Figure 6:
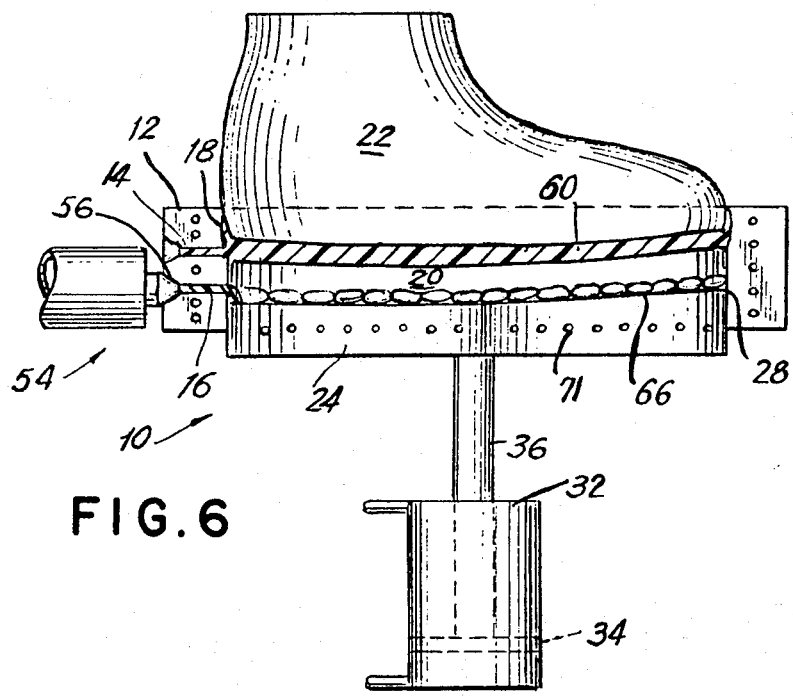
FIG. 6 schematically represents the position which the parts take at that stage of the method where the second injection takes place, FIG. 6 showing the method and apparatus at the end of the second injection.

The apparatus further includes a second gun 54 shown fragmentarily in FIGS. 6 and 7 and used to inject a second quantity of rubber, the nozzle 56 of the second gun being situated at the elevation of the lower injection port 16. This second gun 54 may be identical with the gun 48 shown in the FIG. 1.

The material which is injected by the first gun 48 is a higher modulus rubber whereas as the material injected by the second gun 54 is a lower modulus rubber. As is well known to those skilled in the art, the modulus of the rubber is a measure of the elasticity thereof. For example, rubber which has a modulus of 325 at 300 percent requires a force of 325 lbs. per square inch of cross section to stretch a 1 inch length of the rubber to a length of 3 inches. Thus, the force required to stretch a given length of the rubber derived from the gun 48 through a given increment is greater than the force required to stretch the same length of rubber derived from the gun 54 through the same increment, so that the higher modulus rubber injected by the gun 48 is stiffer than the lower modulus rubber injected by the gun 54. The different rubber materials respectively injected by the guns 48 and 54 may also have different pigmentation. Thus, the rubber injected from the gun 48 may be white, while that injected from the gun 54 may be tan.

The various portions of the mold are heated by any conventional means such as for example by electrical heating elements 71 (FIG. 2) to temperatures required for vulcanizing the rubber materials injected into the mold. As is well known by those skilled in the art temperatures approximately in the range of 200°–500° F. are required. The most suitable temperature within such range depending upon the length of dwell in the mold, the specific polymers used, and the curing or vulcanizing systems employed.

Referring now to FIG. 1, the parts will initially have the position shown in FIG. 1 where the sole plate 24 is retracted to its lowermost elevation shown in FIG. 1 and the mold rings 12 are closed with the upper opening of the mold closed by the lasted upper 22. With the parts in the position of FIG. 1 and with the injection port 14 axially aligned with the nozzle 50, the barrel 46 of the gun 48 is advanced into the outer end of the port 14, and in a well known manner a predetermined, precisely measured quantity of rubber is injected through the port 14 into the cavity defined by the mold rings, the lasted upper, and the sole plate.

As may be seen from FIG. 2, which shows the parts at the end of the injection of a ribbon of the higher modulus rubber 58, the ribbon of rubber has a substantially rectangular cross section. The force with which the rubber is injected is sufficiently great so that the rubber ribbon will be projected all the way from the heel region, where the injection port 14 is located, to the opposed toe region of the mold cavity, and then as the ribbon of rubber continues to flow into the mold cavity it will be deposited on the horizontal upper surface 26 of the sole plate 24 in the form of a generally sinusoidally shaped ribbon as indicated in FIG. 3.

Figure 5:
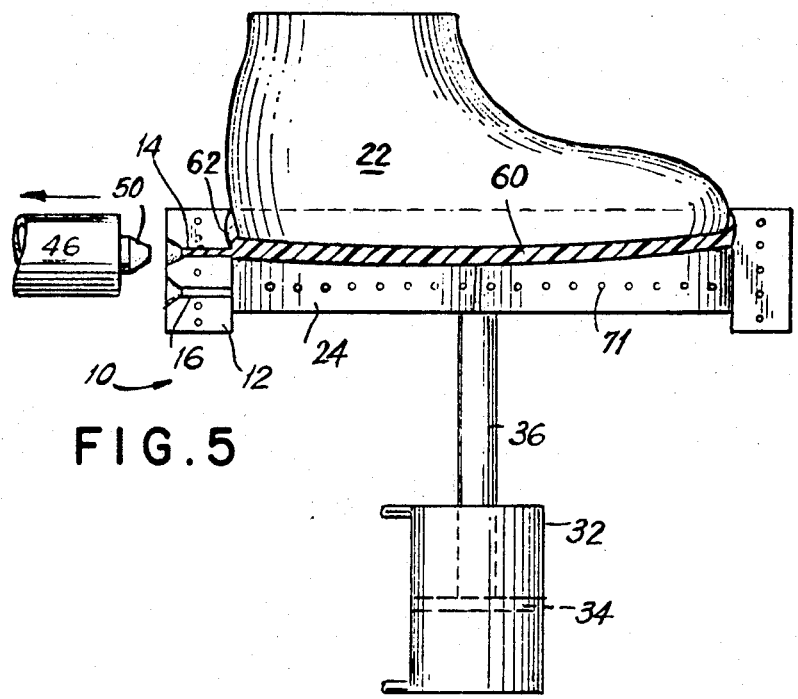
FIG. 5 is a schematic representation of the structure of FIG. 2 subsequent to the first injection after the sole plate has been advanced toward the lasted upper to spread the midsole-foxing component against the upper.

The retracting movement of the barrel 46 trips the switch 42 so that the valve 40 is actuated to introduce air under pressure while the air escapes through the valve 38, and thus the sole plate is raised from the position of FIG. 2 into the position shown in FIG. 5. It is to be noted that the volume of rubber injected is considerably less than the volume of the mold cavity, as is clearly shown in FIG. 2. Therefore, the difficulties encountered in injecting rubber into a cavity which remains constant and which is required to be fully filled out by the injected rubber are avoided with the method and apparatus of the invention.

The sole plate 24 is pushed upwardly to the upper elevation shown in FIG. 5, and it will be noted that at this elevation the sole plate itself closes the lower port 16 so that it is not possible for any injected material to have access to the lower injection port 16 which thus remains unclogged.

As was indicated above, the rubber extrudate 58 is injected at a substantial pressure so as to be projected in the form of a ribbon all the way along the length of the mold to the toe region thereof after which the rubber ribbon becomes deposited horizontally in the manner shown in FIG. 3. To achieve this the rubber may, for example, be injected at a hydraulic ram pressure on the order of 1,200 psi. The sole plate 24 is pressed upwardly to the position shown in FIG. 5 with a pressure acting on the piston 34 which may be on the order of 150 psi, where this piston has a diameter of somewhat less than 8 inches. This force with which the sole plate 24 is urged upwardly toward the lasted upper 22 is sufficient to spread the material 58 in the manner shown in FIG. 5 to form midsole 60 and foxing 62 integral therewith. Because of the relatively small cross-sectional area of injection port 14 the rubber material remaining therein is rapidly vulcanized and prevents the rising sole plate from pushing extrudate in the cavity out through the port 14.

The configuration of the midsole 60 and integral foxing 62 is most clearly apparent from FIG. 8. When the sole plate 24 is at the elevation shown in FIG. 5, which is its upper elevation, the shoulder 28 will determine the configuration of the inner side surface and bottom edge of the foxing lip 64 which projects downwardly from the midsole 60 at the outer periphery thereof.

The time during which the heated sole plate 24 remains in engagement with the extrudate 58, with the parts in the position shown in FIG. 5, is not sufficient to provide full curing of the rubber but at the same time is great enough so that when the sole plate 24 is retracted to its lower elevation shown in FIG. 1 and 2, the surface of the sole plate will cleanly separate from the rubber midsole-foxing component without any tendency of the latter to cling to the sole plate.

With the sole plate 24 again at its lower elevation as shown in FIG. 6, the gun 54 is placed against the outer end of the lower injection port 16 so as to inject a second ribbon this time of the lower modulus rubber which is injected with a force sufficient to cause the ribbon of rubber to project all the way across to the toe of the mold cavity. The rubber ribbon being deposited on the surface 26 of sole plate 24 in the same generally sinusoidally shaped ribbon form as was the case with the extrudate 58 shown in FIG. 3. In this case also a precisely measured quantity of low modulus rubber is introduced in a known way from the gun 54. The gun 54 is retracted after a period of approximately one second subsequent to the injection, and then the sole plate 24 is again raised. The cam at the barrel of the gun 54 trips the switch 42, but at this time the sole plate will rise to an intermediate elevation shown in FIG. 7 which is lower than but adjacent to the upper elevation. The sole plate 24 is also shown at this intermediate elevation in FIG. 8.

Thus, the second extrudate 66, after being deposited in the described manner on the sole plate as shown in FIG. 6, is spread by the rising sole plate 24 against the midsole component 60 into the area surrounded by the depending lip 64 of the foxing 62. It will be noted that the extent to which the foxing lip 64 extends downwardly from the midsole component 60 is greater than the difference between the upper elevation of the sole plate 24 shown in FIG. 5 and the intermediate elevation thereof as shown in FIG. 7, or, in other words, the thickness of the outsole component 68 is less than the width or vertical dimension of the lip 64. Furthermore, it will be noted from FIG. 8 that the sole plate 24, when at its intermediate elevation to form the outsole component 68, has the lower surface of shoulder 28 situated slightly above the region of the top of the port 16 so that the material in the latter is cut off from the outsole component 68.

When the outsole component 68 has cured sufficiently to permit good release of the sole plate 24 the latter is again retracted to its lower elevation. The side rings 12 are separated from each other in a known way so that the lasted upper with the sole structure of the invention vulcanized thereto can be removed. The material which sets within the post 16 is very simply moved therefrom, and the material which sets within the port 14 is integral with and projects from the rear end of the foxing 62. This projecting part at the rear of the foxing can be cut therefrom, and the lip 64 is trimmed at approximately the elevation of the exterior lower surface of the outsole component 68. Trimming of the excess material thus results in a smooth, continuous and sharply defined junction line between, for example, an outsole 68 of tan pigmentation and a white foxing 62.

According to the preferred embodiment of the invention and as is schematically indicated in FIG. 9, the articles of footwear can be manufactured on a rotary turntable 70. The turntable 70 may, for example, have ten stations uniformly distributed about its periphery at angular distances of 36° from each other with a mold assembly and actuating structure, as shown in FIG. 1, situated at each of these stations. The injection gun 48 is shown in FIG. 9 at station 1 while the second injection gun 54 is shown in FIG. 9 at station 5. A complete cycle, or in other words a complete revolution of the turntable 70 requires 3 minutes or 180 seconds, and the time of dwell at each station is therefore 18 seconds. Thus, in a known way at intervals of 18 seconds the turntable 70 is turned through 36°.

After the operations described above have been completed and the structure has arrived at station 10, the mold rings are displaced apart from each other, and the sole plate is retracted so that the last 22 can be raised, turned over, and the shoe stripped therefrom. Now a new upper is placed on the last, turned over and lowered into position. The side rings 12 are closed, the sole plate is in its lower, retracted position, and now the turntable displaces this structure, corresponding to that illustrated in FIG. 1, to station 1 where the gun 48 is situated.

The barrel of the gun advances to the upper injection port 14 in a period of 1 second, it remains at the injection port for 1 second, injects the first i.e., higher modulus material for a period of 3 seconds, remains at the upper injection port for 1 second, and is then retracted in 1 second, so that this complete operation of injection requires 7 seconds. As was indicated above the material may be injected at a pressure on the order of 1,200 psi. Immediately upon completion of the injection, during retraction of the gun barrel, the sole plate is raised to the position indicated in the FIG. 5 and remains in this position until this structure approaches station 5. The action of the pneumatic assembly 30 on the sole plate 24 to advance the latter upwardly is such as to move the sole plate rapidly toward the last 22 until the extrudate on the sole plate contacts the lasted upper and then to mover the sole plate at a relatively slower rate while the latter presses the extrudate against the lasted upper. As each new mold assembly advances from station 10 to station 1, the above operations are repeated at stations 10 and 1.

It will be noted from FIG. 9 that after four increments of turning through 36° with the dwells of 18 seconds between station 1 and 5, 72 seconds will have elapsed. From this period of 72 seconds the initial 7 seconds connected with operation of gun 48 will be subtracted, to provide a cure time of 65 seconds for the higher modulus rubber which is first injected to form the midsole-foxing component.

As the mold approaches station 5 a cam (not shown) trips the switch 42 so as to retract the sole plate 24 to its lower elevation at which it is situated upon arrival at station 5, and now the above operations described in connection with the first gun 48 are repeated with the second gun 54 at station 5, so that at the latter station the injection of the second color extrudate,i.e., of the lower modulus rubber, also requires 7 seconds.

When the barrel of the second gun 54 is retracted the switch which controls the movement of the sole plate is again tripped so that the sole plate is raised into the position indicated in FIG. 7, and now the assembly remains in this position through all of the several stations 6–9 until the station 10 is reached, where the operations described above in connection with removal of the work at the station 10 takes place. In advancing from station 5 to station 10, there are five increments of turning of 36° each with dwell periods of 18 seconds in between, so that the total time required for the work to reach station 10 after leaving station 5 is 90 seconds, from which the 7 seconds required for operation of the second gun are subtracted to provide a curing time for the second extrudate of 83 seconds.

Thus, with this construction it is possible for an operator at station 10 to remove a shoe having the structure indicated in FIG. 8 every 18 seconds so that the shoe can be further processed by having the foxing trimmed at the elevation of the exterior surface of outsole 68 and by having the material previously located in injection port 14 removed. Of course, within this period of 18 seconds a new lasted upper is introduced into the space which is surrounded by the side rings after the latter are closed.

It will be noted that with the method and apparatus of the invention, to provide the above-described article of the invention, the first gun is retracted away from the mold in such a short time that it is not possible for heat from the mold to vulcanize any of the rubber compound at the gun nozzle itself. On the other hand, the rubber material located in each of the injection ports is, in view of the relatively small cross-sectional size of these ports vulcanized at a sufficiently rapid rate which prevents any of the stock which is compressed by the sole plate from being extruded out through the port. It is to be noted that at station 5 the gun barrel is retracted within a period of 1 second after injection of the extrudate so as to prevent curing of rubber in the tip of the gun.

The vertical depth of the shoulder 28 is preferably on the order of 25–30 percent greater than the thickness of the outsole component 68.

Of course, the external dimensions of the mold rings 12 are constant so that they will fit the machine which moves them toward and away from each other. Therefore, when making relatively small shoes which require smaller cavities the horizontal wall thickness of the mold rings increases, thereby lengthening the injection ports. The increased length of these ports will normally require the cross-sectional area of the ports to be altered accordingly so that the leading end of the ribbon extrudate will travel the required distance, without any impediment, toward the opposed toe region of the mold. Because of the particular configuration of the mold and the presence of the lasted upper in its proper position at the upper end of the mold cavity, the upper injection port 14 may be slightly inclined in a direction leading downwardly into the mold cavity while the lower injection port 16 is horizontal.

As a result of providing the sole plate itself with the shoulder 28 which defines with the mold rings the recess of forming the foxing lip or rim 64, the inner side surface 20 of the mold rings extends vertically all the way up to the bottom edge of the groove 18. It is this construction which with the shoulder 28 along the periphery of the sole plate enables the lip 64 of foxing 62 to be formed in such a way that when the outsole component 68 is formed it will not intermix with the lip 64 nor with any flash which may have been formed during the forming of the foxing 62. A sharp clear line of demarcation is provided between the two-color rubber sole components. The trimming is easily carried out with a clean cutting away of the excess material being easily achieved. To facilitate the foregoing the vertical surface of shoulder 28 may have a slight draft of the order of 2°. Moreover, the surrounding of the lower modulus outsole component 68 by the foxing protects the softer outsole component while at the same time the stiffer component 60 protects the foot against bruising if the outsole component should engage pebbles, stones, or the like. In addition, the use of a lower modulus outsole component 68 enables the shoe of the invention to achieve a better traction.

By way of example, the rubber materials used for the midsole-foxing component and for the outsole component may be as follows:

| | A | B | Parts by Weight C | D |
|---|---|---|---|---|
| Synpol 8140 (SBR-Styrene Butadiene copolymer rubber) | 100.0 | 100.0 | 100.0 | 100.0 |
| Hydrated Silica (Hi-Sil 215) | 34.0 | 30.0 | 34.0 | 44.0 |
| Hydrated Sodium Silico Aluminate (Zeolex 23) | 4.0 | 4.0 | 4.0 | 4.0 |
| Par Oil i.e. (Paraffin Oil) | 39.0 | 39.0 | 39.0 | 39.0 |
| Hydrocarbon Resin (BJ-10 Resin) | 40.0 | | | |
| Polyethylene Glycol Mole Wt. 4000 (Carbowax 4000) | 4.3 | 4.3 | 4.3 | 4.3 |
| 4,4'-Thio-bis (6-T-butyl-3-methyl Phenol (Santowhite crystals) | .25 | .25 | .25 | .25 |
| Paraffin Wax (Ross Wax) | .30 | .30 | .30 | .30 |
| Zinc dimethyl di thio carbamate (Methazate) | .87 | 1.12 | 1.12 | 1.12 |
| n-t-Butyl-2-benzothiazole sulfenamide (Delac NS) | | 1.08 | 1.08 | 1.08 |
| Benzo Thiazyl disulfide (MBTS) | 1.08 | | | |
| Dipentamethylenethiuram Tetrasulfide (Tetrone A) | .30 | .30 | .30 | .30 |
| Zinc Oxide | 1.00 | 1.00 | 1.00 | 1.00 |
| Sulfur (Crystex) | 2.94 | 2.94 | 2.94 | 2.94 |
| Modulus at 300% Elongation Pounds/square-inch ASTM D-412-66 | 225 | 255 | 325 | 430 |

Experience has shown that the modulus of the first-injected rubber should be at least 100 lbs. per square inch at 300 percent elongation greater than the modulus of the second-injected material. This modulus differential will prevent creeping and wrinkling of the midsole by the outsole. Thus, if composition D of the above table is used for the midsole, then any of the other compositions A, B, or C can be used for the outsole since the modulus 430 is more than 100 greater than the modulus of any of the other compositions. Also, it is possible to use compund C as a midsole together with compound A as the outsole, since in this case also there is a sufficiently great modulus differential. However, compound B would be unsuited as a midsole for use with compound A as an outsole, and compound C would not be suited for use with compound B as an outsole because in each of these cases the modulus differential is less than 100. Under ideal conditions the midsole has the highest possible modulus and the outsole has the lowest possible modulus. However, as the modulus increases the flow index decreases, so that a balance or compromise of the desirable characteristics must be provided. The modulus of the compounds can be changed in various ways, as, by changing accelerators, by incorporating suitable resins, and by incorporating suitable fillers. Thus, the Hi-Sil filler of the above table will increase the modulus, while the BJ-10 Resin will reduce the modulus.

It will be understood that while in the above example an SBR composition has been chosen to illustrate the article of the present invention and the method and apparatus used to make the same, chloroprene elastomer based compounds as well as compounds based on butyl rubber, EPDM, natural rubber, and other compounds similar to the foregoing can be used as well.

Similarly, the outsole-component and the midsole foxing component may each be of a different one of the afore listed or similar compositions.

It will further be understood that as a result of the method and apparatus of the present invention any flash 80, i.e. first injected rubber material which may find its way between the inner mold surface 20 and the outer peripheral surface of sole plate 24 during forming of the lip 64 of foxing 62, will be pressed outwardly against the mold surface 20 by the second injected rubber when the latter is pressed against the midsole-foxing component. Thus, any such flash of first injected material will not be in a position both as a result of its location and of such outward pressing, to intermix with the second injected material anywhere in the region of the ultimate trim line.

Having thus described our invention, what we claim and desire to protect by Letters Patent is:

1. In an apparatus for two-color injection molding during the manufacture of rubber-soled footwear: a pair of mold side rings have a closed position where they surround and define part of a predetermined cavity adapted to be closed at an upper portion by a lasted upper; a sole plate surrounded by and slidably engaging said mold rings in their closed position; means coacting with said sole plate for moving the latter sequentially between a first position in which said cavity has a given first volume, a second position in which said cavity has a given second volume smaller than said first volume, a third position in which said cavity has a given third volume larger than said given second volume, and a fourth position in which said cavity has a given fourth volume smaller than said given third volume but larger than said given second volume; first injection means associated with said side rings and communicating with said cavity for injecting into said cavity, when said sole plate is in said first position thereof, a quantity of midsole rubber of substantially smaller volume than said first volume of said cavity; and second injection means associated with said side rings and communicating with said cavity for injecting into said cavity, when said sole plate is in said third position thereof, a quantity of outsole rubber of substantially smaller volume than that part of said cavity which is not occupied by said midsole whereby said moving means raises said sole plate from a lower to an upper elevation during application of a rubber midsole to said lasted upper and after initially retracting said sole plate to a lower elevation raises the sole plate a second time to an intermediate elevation lower than but adjacent to said upper elevation during application of an outsole to said midsole.

2. The combination of claim 1 wherein said injection means each comprises an injection port and both of said injection ports are situated in said side rings at an elevation higher than said lower elevation of said sole plate and said ports including an upper port situated at an elevation higher than said upper elevation of said sole plate and a lower port beneath said upper port and closed by said sole plate when the latter is at said upper elevation thereof.

3. The apparatus of claim 1 wherein said sole plate is formed at its upper surface which is directed toward said lasted upper with a peripheral shoulder which determines the configuration of inner and bottom end surfaces of a foxing integral with the midsole.

4. The combination of claim 3 and wherein said lower port is situated at least in part below said peripheral shoulder of said sole plate at said intermediate elevation thereof.

5. The combination of claim 3 and wherein the difference between said upper and intermediate elevations is less than the depth of said peripheral shoulder of said sole plate, so that at said intermediate elevation of said sole plate the foxing integral with said midsole extends below the upper surface of said sole plate.

6. In an apparatus as recited in claim 3 wherein said sole plate has an outer peripheral surface portion surrounding said peripheral shoulder thereof and in sliding engagement with inwardly facing surface portions of said mold rings whereby flash which may form during application of the midsole-foxing rubber to the lasted upper will form intermediate said mold ring and sole plate surfaces at the outermost regions of the bottom end surface of the foxing in position to be pressed against said inwardly facing surfaces of said mold rings by the outsole rubber during application of the outsole to the midsole whereby intermixing of the flash material with the outsole rubber in the region of the inner surface of the foxing is prevented.

7. The apparatus of claim 1 wherein said sole plate is at the same elevation when in said first and third positions thereof.

* * * * *

PO-1050
(5/69)

UNITED STATES PATENT OFFICE
CERTIFICATE OF CORRECTION

Patent No. 3,751,200          Dated August 7, 1973

Inventor(s) JOHN F. BORISUCK et al.

It is certified that error appears in the above-identified patent and that said Letters Patent are hereby corrected as shown below:

Column 10, line 66, delete the word "have" and insert therefor --having--.

Signed and sealed this 20th day of August 1974.

(SEAL)
Attest:

McCOY M. GIBSON, JR.
Attesting Officer

C. MARSHALL DANN
Commissioner of Patents